3,050,523
PREPARATION OF PYRIMIDINES
William E. Erner, Wilmington, Del., and Harold A. Green, Elkins Park, and George Alexander Mills, Swarthmore, Pa., assignors to Air Products and Chemicals, Inc., a corporation of Delaware
No Drawing. Filed Jan. 8, 1960, Ser. No. 1,166
13 Claims. (Cl. 260—251)

The present invention relates to novel methods for preparation of pyrimidine and of substituted pyrimidines having an aliphatic or aromatic hydrocarbon substituent in the 2 position thereof:

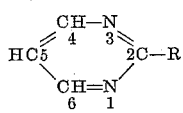

Pyrimidines as a class of organic compounds have long been known for their physiological activity. Important products containing the pyrimidine nucleus have been obtained from natural plant sources and some of these have also been synthesized, including purines, uric acid derivatives, barbituric acids, and fission products of nucleic acids. Pyrimidine and 2-alkyl pyrimidines may be used as starting materials for preparation of more complex physiologically active compounds, including cytosines, uracils, alloxans, etc. Pyrimidine can be prepared in the laboratory by the action of zinc dust and water (dehalogenation) on the trichloropyrimidine obtained from reaction of barbituric acid with $POCl_3$.

In accordance with the present invention, pyrimidine and 2-hydrocarbon radical substituted pyrimidines are more simply prepared in acceptable yields by reaction of an alkylene 1–3 diamine (one having the amino substituents on alternate C atoms) with an organic carboxylic acid, ester or amide. The reaction is carried out over supported noble metal catalysts having dehydration and dehydrogenation activity, within the temperature range of 600–900° F., the catalyst being essentially free of halide, i.e., having a halide content of less than 0.1%.

In the preferred practice of the invention, the alkylene 1–3 diamine is reacted at temperatures of about 700–800° F. with an alkyl or aryl non-oxo-carbonylic compound in the presence of platinum-alumina or palladium-alumina catalyst relatively free from an acidic function. In most cases, the reaction can be carried out in vapor phase at atmospheric pressure; however, if the non-oxo-carbonylic compound used as reactant is prone to thermal dissociation of the elevated temperature, elevated pressure may be employed as up to 600–800 p.s.i.g.; or the reaction may be carried out under reduced pressure sufficient to effect vaporization of the diamine and of the carbonylic reactant without dissociation.

From the reaction effluent, the obtained pyrimidine compound can be separated by azeotropic distillation. It has been found, however, that easier separation and greater improved yields of resired product are possible if, prior to distillation, the reaction effluent is treated with $CO_2$ to separate out unreacted and formed primary amines by conversion to carbonate or bicarbonate salts.

The reaction is illustrated by the following; when using 1,3-diamino-propane (trimethylene diamine) as the reactant with various types of carboxy compounds:

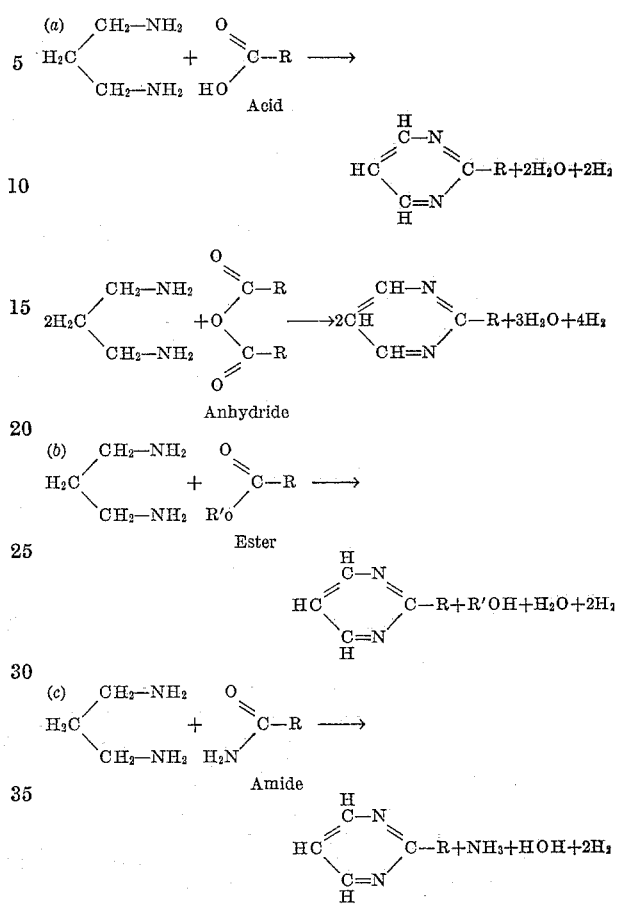

In the above formulations, R is an alkyl residue, preferably of up to 6 carbon atoms, or an aryl radical (e.g. phenyl, benzyl), and $R^1$ is an alkyl residue of up to 6 carbon atoms derived from an esterifying alcohol. By selection of the appropriate acid, anhydride, ester, or amide, there are obtained the corresponding alkyl, aryl, or aralkyl substituted pyrimidines having the substituent in the 2 position of the hetero ring formed. With formic acid and 1,3-propylene diamine unsubstituted pyridine is obtained. The alkylene diamine may be normal or branched and may have up to 6 or more carbon atoms in a straight or branched chain, provided that the amino groups are on alternate carbons.

In general, the alkylene diamine and carboxylate (or amide) should be reacted in substantially equal molar proportions. The reaction may be benefitted by the presence of added hydrogen gas, from the standpoint of improving useful life of the catalyst.

Supported noble metal catalysts useful in the described process include those comprising 0.1 to 5% by weight of platinum or palladium supported on silica gel, charcoal or activated carbon, or on magnesia.

The preferred catalysts comprises up to 2% platinum on an activated alumina support substantially free of halide ions. Such catalysts can be prepared by impregnation of the alumina with a solution of platinum nitrate or with solutions of other halide-free platinum salts or complexes, as for example commercial "P-salt"

$$[(NO_2)_2 \cdot Pt \cdot (NH_2)_2]$$

When the impregnating solution employed is the more usual chloroplatinic acid type or other soluble platinum halide salt or complex, and the alumina impregnated therewith is thereafter subjected to the conventional reduction with hydrogen, the halide is nevertheless retained in the catalyst in chemical association with the alumina or otherwise. Platinum-on-alumina catalysts containing such halide have pronounced activity for promoting acid-catalyzed reactions including isomerization, olefin polymerization and cracking, in addition to the hydrogenation-dehydrogenation function of the platinum. To remove the halide from the platinum-alumina catalyst, accordingly, the catalyst is treated with reducing gas (e.g., hydrogen) and steam, until the halide content is reduced to below 0.1% halide ion by weight of catalyst.

A convenient method for preparing platinum-alumina catalyst of low halide content involves subjecting the halide-containing platinum-alumina catalyst to a reducing atmosphere containing 25 to 75 mol percent steam and 10 to 75 mol percent of a reducing gas, such as hydrogen, and if desired or required, the balance of inert gas, such as nitrogen. The treatment with such gaseous mixture is effected at temperatures in the range of 700 to 1000° F. for 1 to 36 hours. A superior catalyst employed in the process of the invention is one thus prepared comprising, prior to steam treatment, 0.5% platinum, 0.5% chloride and 99% gamma alumina.

Catalysts containing other noble metals of the platinum family, such as palladium, can be similarly prepared on alumina employing halide-free impregnating solutions of such noble metal compounds or by employing halide containing solutions with subsequent steaming to remove halide.

When noble metal catalysts are employed, supported on carriers other than those composed of or comprising alumina, no difficulty is encountered with respect to the halide from the impregnating metal solution since the same is substantially removed during conventional reduction. Suitable carriers of this type for platinum or other noble metal of the platinum family, already named above, include activated carbon, magnesia and silica. There also come into consideration supported platinum and other noble metal catalysts on silica-alumina dried gel carriers. Removal of halide, when chloroplatinic acid or other halide-containing impregnating solution is employed in their preparation, can be effected by steaming in a reducing atmosphere in the same manner as above described for the gamma alumina supported catalysts. Since silica-alumina of itself contributes a high acid function, such carrier should be subjected to an attenuating treatment as by heat treatment in a steam atmosphere or by other methods already known to the art. While such catalysts on supports other than activated alumina (gamma alumina) are operative to greater or less degree in the pyrimidine synthesis reactions according to the invention, these are not to be considered equal in all respects in yield and selectivity to the preferred platinum-alumina catalysts of the described halide-free or low halide content.

In carrying out the synthesis reaction, the carboxylic compound is added to the diamine compound slowly with agitation and with cooling. The mixture, which may be or contain an acid addition salt of the amine, is passed over a fixed bed of the catalyst at a charge rate of 0.5 to 2 volumes (as liquid) per hour per volume of catalyst. The charge may be preheated to about reaction temperature enroute or by contact with a hot layer of inert solids above the catalyst bed. To facilitate handling, the liquid charge may be diluted with water or other non-interfering diluent.

*Example*

To 222 parts by weight of 1,3-diamino-propane containing 75 parts water, there were slowly added with agitation and cooling (at 30–40° C.) 180 parts of glacial acetic acid.

The prepared charge was then passed over a heated bed of steamed platinum-alumina catalyst (0.5 wt. percent Pt) at about 800–810° F. and at the rate of 0.75 volume (liquid) per hour, together with ⅔ mol hydrogen per mol of diamine. The vaporous reactor effluent was cooled and condensed and the condensate collected. Total liquid recovery was 93% by weight of charge.

(*a*) The liquid reaction product was diluted with about 50% by weight benzene and distilled to drive off water azeotropically. Benzene, separated from the water in the distillate, was continuously recycled to the distillation unit, and finally the recovered benzene was recombined with the dewatered product in an amount approximately equal by weight to that of the dewatered product. The mixture of benzene and dewatered reaction product was divided into two portions.

(*b*) One of the portions of the benzene mixture from (*a*) above was introduced into a separatory funnel and a small amount (about 5%) of water added thereto. Carbon dioxide was then bubbled into the mixture for six hours. The material in the separatory funnel formed 2 liquid layers, one a heavy viscous bottom layer and a benzene solution in the top layer. The benzene layer was decanted and divided into two portions. One portion was subjected to mass spectrometric analysis and the second portion was distilled in a high efficiency column as hereinafter described.

(*c*) The second portion of the mixture of benzene and dewatered reaction product from (*a*) above was also split into two portions, one of which was subjected to M.S. analysis and the other subjected to fractional distillation.

(*d*) Distillation of the sample of the benzene solution (after $CO_2$ treatment) from (*b*) above was carried out as follows. The sample was charged to a 50-plate Podbielniak column and fractionated at 50/1 reflux. Numerous distillate cuts were collected separately, that collected over the 130–135° C. range (heart cut) constituting the principal 2-methyl pyrimidine product. (Reported B.P. of 2-methyl pyrimidine is 130–131° C.) This cut amounted to 31.5% by weight of theoretical yield of 2-methyl pyrimidine, or 14.5% by weight of the total reactor charge.

(*e*) The sample from (*c*) above which had not been treated with $CO_2$ was distilled in the same manner as described in (*d*) above, and the 2-methyl pyrimidine fraction collected from cuts boiling in the range of 128–133° C., which amounted to 24% by weight of theoretical yield of 2-methyl pyrimidine.

(*f*) Mass spectrometric analysis of the sample from (*b*) above which had received $CO_2$ treatment showed a content of 46.6% by weight methyl pyrimidine (94 gms./ mol mass), while the sample from (*c*) above which did not receive the $CO_2$ treatment showed a content of 33% by weight methyl pyrimidine.

(*g*) A portion of the 2-methyl pyrimidine heart cut fraction from (*d*) above was subjected to ultimate analysis and showed:

| Percent | Sample | | | Theoretical for 2-methyl pyrimidine |
|---|---|---|---|---|
| | #1 | #2 | Avg. | |
| H | 6.56 | 6.56 | 6.56 | 6.38 |
| C | 61.6 | 59.5 | 60.6 | 63.8 |
| N | 27.3 | 26.4 | 26.9 | 29.8 |

The slight departures from the theoretical composition shown by the analysis are attributed to the presence of small amounts of non-nitrogenous or oxygenated congeners present.

The picrate of 2-methyl pyrimidine prepared from this sample melted at 104–107° C. as compared with 106–107° C. reported for this compound in the literature (Beilstein). The obtained picrate was recrystallized twice from absolute ethanol obtaining a product having a reproducible melting point of 114.5–116.5° C., indicative of higher purity than the compound hitherto reported in the literature.

The refractive index of the heart cut from the 130–135° C. fraction was found to be $n$ 30/D=1.4860 as opposed to $n$ 17/D=1.4173 reported by A. Holland (Chem. and Ind., 1954, page 786). The previously reported value of Holland is doubtful since compounds having aromatic character show higher refractive indices. For example, the refractive indices of related pyrazines and pyrimidines are in the range 1.4900–1.5000 (2-methyl pyrazine $n$ 18/D=1.5067; 4-methyl pyrimidine $n$ 25/D=1.494). Some of the other reported data on the physical properties of alkyl pyrimidines are likewise questionable and cannot be used as criteria for comparison with the manifestly more highly purified products obtained by the methods of the present invention.

C-methyl pyrimidines (with methyl substituted in the 4, 5 or 6 position) react with excess sodamide (in decalin) to form 2-amino-methyl-pyrimidines. Thus, 6-methyl pyrimidine (obtainable from 1,3-diamino-butane and formic acid) by such reaction with excess sodamide in absolute decalin at 130–160° C. gives 2-amino-6-methyl pyrimidine. The 2-amino-pyrimidines are used as starting compounds for preparation of the sulfaryl amide drugs, e.g. sulfamerazine from 2-amino-6-methyl pyrimidine by condensation reaction with acetyl sulfanilyl chloride and subsequent hydrolysis of the acetyl group with NaOH.

The reaction of the 1,3-alkylene diamine and carboxy compound described in the principal example and the method employed are similarly applicable to a wide variety of alkylene diamines, having the amino groups on alternate carbons, and various carboxy compounds (or their amides). The folowing are illustrative:

| 1, 3-Diamine | Carboxy Compound | Pyrimidine Product |
| --- | --- | --- |
| 1, 3-diamino-propane | acetic acid | 2-methyl pyrimidine. |
| Do | formic acid | pyrimidine. |
| Do | benzoic acid | 2-phenyl pyrimidine. |
| Do | benzamide | Do. |
| 1, 3-diamino-butane | methyl formate | 4-methyl pyrimidine. |
| Do | acetic anhydride | 2, 4-dimethyl pyrimidine. |
| Do | ethyl acetate | Do. |
| 1, 3-diamino-pentane | acetic acid | 2-methyl-4-ethyl pyrimidine. |
| Do | acetamide | Do. |
| Do | ethyl propionate | 2,4-diethyl pyrimidine. |
| 2, 4-diamino-pentane | benzoic acid | 2-phenyl-4, 6-dimethyl pyrimidine. |
| Do | ethyl acetate | 2, 4, 6-trimethyl pyrimidine. |

Similarly, other combinations of reactive 1,3-diamines and carboxylic compounds may be selected for reaction under suitable conditions of temperature and pressure to effect a dehydration and dehydrocyclization to form pyrimidine or its derivatives.

The term "non-oxo-carbonylic" as herein employed has reference to compounds containing C=O in combination other than found in ketones and aldehydes; consistent with the usage of the term in U.S. Patent Office classification (Classification Bulletin No. 85, p. 9).

Obviously many modifications and variations of the present invention as hereinbefore set forth may be made without departing from the spirit and scope thereof and therefore only such limitations should be imposed as are indicated in the appended claims.

What is claimed is:

1. The method of preparing pyrimidine compounds which comprises reacting an alkylene diamine with a non-oxo-carbonylic compound in the presence of catalyst having dehydration and dehydrogenation activity, said alkylene diamine having the amino groups on alternate carbon atoms thereof, said catalyst comprises a small amount of noble metal of the platinum family on a porous carrier essentially free of halide, and said non-oxo-carbonylic compound being selected from the group consisting of formic acid and compounds of the formulae (a) $$R-\underset{\underset{O}{\|}}{C}-OH,$$

(b) $$R-\underset{\underset{O}{\|}}{C}-O-\underset{\underset{O}{\|}}{C}-R,$$

(c) $$R-\underset{\underset{O}{\|}}{C}-NH_2, \text{ and}$$

(d) $$R-\underset{\underset{O}{\|}}{C}-OR'$$

in which R is selected from the group consisting of alkyl of up to 6 carbon atoms, phenyl and benzyl, and R' is an alkyl residue of an esterifying alcohol of up to 6 carbon atoms.

2. The method according to claim 1 wherein said catalyst consist essentially of platinum on a high surface area carrier.

3. The method according to claim 1 wherein said catalysts consist essentially of platinum on an aluminaceous carrier having 0 to 0.1% by weight halide.

4. The method of claim 1 wherein said non-oxo-carbonylic compound is an alkyl mono-carboxylic acid.

5. The method of claim 1 wherein said non-oxo-carbonylic compound is an ester of an alkyl mono-carboxylic acid.

6. The method of claim 1 wherein said non-oxo-carbonylic compound is an amide of an alkyl mono-carboxylic acid.

7. The method of preparing 2-alkyl substituted pyrimidines which comprises reacting in the presence of supported platinum catalyst a 1,3-alkylene diamine having up to 6 carbon atoms in a straight chain, with an alkyl mono-carboxylic acid compound, said catalyst being relatively free of halide, and comprising 0.1 to 5% of platinum on a porous water sorbent carrier.

8. The method of preparing pyrimidine which comprises reacting at temperatures of 600–900° F. 1,3-diamino-propane with formic acid, in the presence of platinum catalyst having a porous water-sorbent carrier, and containing less than 0.1% by weight halide.

9. The method of preparing 2-alkyl pyrimidines which comprises reacting in vapor phase and in the presence of added hydrogen, 1,3-diamino-propane with a homologue of formic acid, said reacting being effected at temperatures of about 600–900° F. and in the presence of platinum-alumina catalyst containing less than 0.1% by weight halide.

10. The method of preparing 2-methyl pyrimidine which comprises reacting acetic acid with 1,3-diamino-propane, at temperatures in the range of 700–800° F. and in the presence of catalyst composed of a small amount of platinum on porous alumina essentially free of halide; dehydrating the obtained reaction product and distilling the dehydrated material with the recovery of a cut boiling in the approximate range of 2-methyl pyrimidine.

11. The method according to claim 10 wherein said distillation is carried out in the presence of benzene.

12. The method according to claim 10 wherein the reaction product is treated in the presence of benzene with $CO_2$ to form a bottom layer of benzene-insoluble by-products and the separated benzene top layer is fractionally distilled to recover the cut in the approximate boiling range of 2-methyl pyrimidine.

13. The method of preparing pyrimidine and 2-hydrocarbon substituted derivatives of pyrimidine which comprises reacting a 1,3-alkylene diamine with a non-oxy-carbonylic compound in the presence of essentially halide-free platinum-alumina catalyst at a temperature in the range of 700–800° F.; said alkylene diamine being selected from the group consisting of straight chain and branched chain compounds having up to 6 carbon atoms in a straight chain, and said carbonylic compounds being selected from the group consisting of formic acid and compounds of the formulae (a) 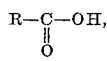

(b) 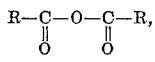

(c) 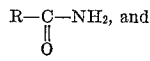

(d) 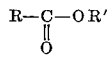

in which R is selected from the group consisting of alkyl of up to 6 carbon atoms, phenyl and benzyl, and R' is an alkyl residue of an esterifying alcohol of up to 6 carbon atoms.

References Cited in the file of this patent

UNITED STATES PATENTS

| | | |
|---|---|---|
| 2,019,883 | Wulff et al. | Nov. 5, 1935 |
| 2,252,721 | Miescher et al. | Aug. 19, 1941 |
| 2,534,828 | Mitchell et al. | Dec. 19, 1950 |
| 2,649,397 | Ballard | Aug. 18, 1953 |
| 2,658,895 | Ballard et al. | Nov. 10, 1953 |
| 2,937,174 | Tousignant | May 17, 1960 |
| 2,946,791 | Dornfeld | July 26, 1960 |

OTHER REFERENCES

Zelinsky et al.: Berichte, vol. 58B, pages 1298–1303 (1925).

Ochiai et al.: Chem. Abstracts, vol. 33 (1939), 3791.

Aspinall: J. Amer. Chem. Soc., vol. 62 (1940), pages 2160–2.

Shreve et al.: Ind. Eng. Chem., vol. 32 (1940), pages 173–178.

Elderfield: Heterocyclic Compounds, vol. 6 (1957), page 263.

UNITED STATES PATENT OFFICE
CERTIFICATE OF CORRECTION

Patent No. 3,050,523 August 21, 1962

William E. Erner et al.

It is hereby certified that error appears in the above numbered patent requiring correction and that the said Letters Patent should read as corrected below.

Column 1, line 59, for "resired" read -- desired --; column 2, line 49, for "pyridine" read -- pyrimidine --; column 6, line 71, for "non-oxy-" read -- non-oxo- --; column 7, line 2, for "compounds" read -- compound --.

Signed and sealed this 16th day of July 1963.

(SEAL)
Attest:

ERNEST W. SWIDER
Attesting Officer

DAVID L. LADD
Commissioner of Patents